May 19, 1936.  A. F. KLINGNER  2,041,136
SPARK PLUG GASKET
Filed Dec. 20, 1932
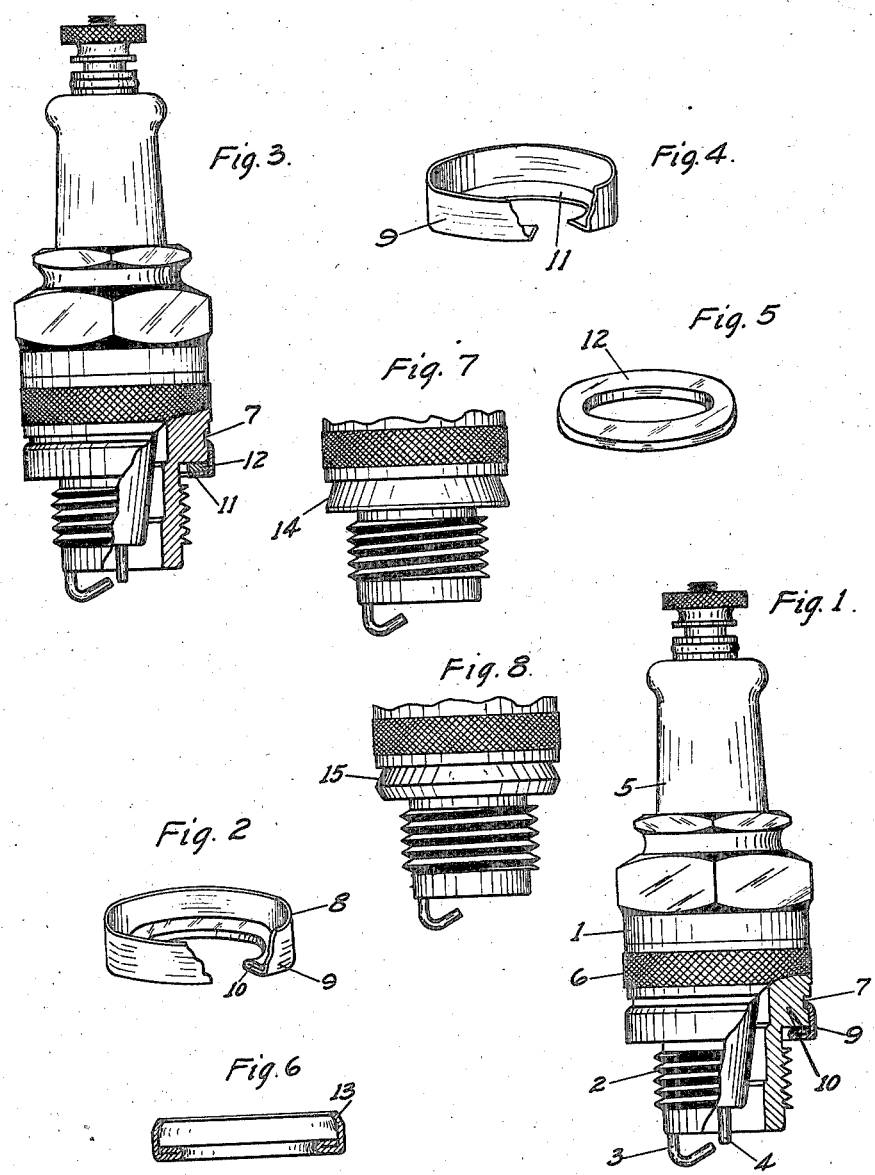
INVENTOR
Adolph F. Klingner
C. D. T. Libby
ATTORNEY Patented May 19, 1936

2,041,136

UNITED STATES PATENT OFFICE 2,041,136

SPARK PLUG GASKET

Adolph F. Klingner, Hellertown, Pa., assignor to Edison-Splitdorf Corporation, West Orange, N. J., a corporation of New Jersey Application December 20, 1932, Serial No. 648,027

2 Claims. (Cl. 123—169)

This invention relates to the design of a gasket especially adapted for use in connection with a spark plug used on internal combustion engines.

In the use of spark plugs, not considering those having a pipe thread on the shell of the plug, it is customary and essential that a gasket be used between the seat on the spark plug shell and in that part of the engine which would normally be engaged by the shell-seat without the gasket in position. The gasket usually provided constitutes a ring of soft metal, either solid or in combination with a heat-resisting fibrous material such as asbestos.

Such gaskets usually have an internal diameter considerably greater than the threaded part of the shell so that they may be readily slipped over the threads, with the result that when the plug is screwed into its threaded hole in the engine, the gasket will usually shift into a more or less eccentric position and will therefore not provide the best seat for the plug. Furthermore, this gasket being loose on the spark plug shell, it is many times lost when the plug is being changed. Also, this type of gasket causes some inconvenience in the assembly of the plug to the engine.

It is one of the objects of my invention to provide a spark plug gasket which is integral with the plug and cannot be lost when the plug is removed from the engine, or cause any inconvience when putting the plug in position in the engine. In addition, it saves handling the extra part and obviates the loss of the gasket during packing and shipping operations.

Another object of my invention is to provide a gasket which is assembled on the plug in a centralized position, whereby the best gasket seat is provided.

While attaining the principal objects of my invention, it is another object to provide a gasket which in its assembled relation with the plug is attractive in appearance, thereby adding to the salability of the plug.

Other advantages will be pointed out in the description taken with the annexed drawing, wherein:

Figure 1 is an elevation of a plug showing one form of my gasket applied thereto.

Figure 2 is a perspective view of the gasket used with the plug shown in Figure 1, before its assembly to the plug, a section being broken away to show the form of construction used.

Figure 3 is a view of a plug showing a modified form of gasket.

Figures 4 and 5 illustrate the parts of the form of gasket shown in Figure 3.

Figure 6 shows a sectional view through a further modified form of gasket which is constructed somewhat similar to that shown in Figure 2.

Figures 7 and 8 illustrate the lower portion of the shell of a plug more especially adapted to receive the form of gasket shown in Figure 6.

In the drawing, 1 is the shell of a spark plug having a threaded portion 2 for screwing the shell into the engine. The shell 1 is provided with a ground electrode 3 adapted to cooperate with a central electrode 4 carried by an insulator 5. The shell 1 is provided with an ornamental knurled portion 6 and a groove 7 into which the edge 8 of a gasket having a rim portion 9 is adapted to be spun, as shown in Figure 1.

The gasket shown in Figures 1 and 2 has its inner edge 10 folded back toward the side of the gasket which terminates in the edge 8. If desired, a thin strip of asbestos may be clamped beneath the bent-over portion 10. In the manufacture of the gasket, the bent-over portion 10 is preferably not squeezed all the way down to the flat position shown in the drawing, so that when the plug is screwed into position in the engine, considerable resilience through the gasket will be interposed between the plug and the engine, thereby more securely locking the plug in position.

In the form of gasket shown in Figures 3, 4, and 5, the gasket is made out of a single piece of metal of the same thickness and provided with an inner flange 11 which is adapted to receive a washer 12 before it is assembled to the plug as shown in Figure 3.

In the form of gasket shown in Figure 6, the upper edge is turned inwardly to form an annular lip 13 which may be sprung over the end of the shell 1 or the portions 14 and 15 as illustrated in Figures 7 and 8.

The gaskets herein illustrated and described can be very readily punched and formed from soft sheet metal, such as copper, although they may be turned, at greater expense, from rod stock, in which case the required thickness given by the washer 12 or the inturned portion 10 is directly provided.

In some cases, where the surface of the engine engaged by the spark plug is ground smooth, or where for some other reason the thickness of the gasket metal at the seat portion is not required, a plain cup-shaped gasket as shown in Figure 4, without the washer of Figure 5, may be used alone. While the washer 12 shown in Figure 5, is illustrated as a plain flat washer to be made of suitable material, it may be a folded washer with or without a strip of asbestos positioned within the folds as in Figure 2.

In substantially all cases, the shell of the plug is usually made of steel subsequently blued by a heat process, and the assembly of the gasket, made of another metal such as copper, adds greatly to the attractiveness of the plug.

In addition, the gasket positioned as herein shown and described, promotes the dissipation of heat since the gasket is directly interposed at the hot junction between the spark plug and the engine, whereby the heat is dissipated directly by the gasket acting as a radiator and as a direct transfer agent of heat from the cylinderhead to the exterior part of the plug shell.

Having thus described my invention, what I claim is:

1. In a spark plug having a shell with a ground electrode and carrying directly an insulator for a central electrode and having an integral annular engine seat with an exterior machine screw threaded end adjacent said seat, said shell further having a gasket engaging formation positioned on the exterior periphery of the shell above said seat, the combination with a gasket having an annular flat flange of considerable area to fit on said shell seat thereby forming a seat of substantial area for the shell of the plug against the cylinder wall of the engine, said gasket being composed of good heat-conducting metal which will function to dissipate heat coming from said shell, said gasket flange having an annular rim extending from the outer periphery thereof upwardly around the outer part of the shell adjacent said seat thereon, said rim being forced into engagement with said exterior shell formation to permanently fix the gasket to the shell in concentric position with respect to the said threaded end of the plug shell and the adjacent seat.

2. In a spark plug, having a shell with its engine end machine screw threaded and an integral annular engine seat above and adjacent to said threaded end, said shell having an exterior annular interlocking formation thereon above said seat and concentric therewith, the combination with a gasket having an annular flat flange the central hole therein being of a size to easily pass the gasket over said threaded shell end so the flange will engage with said plug seat, said gasket being composed of good heat-conducting metal which will function to dissipate heat coming from said shell, said flange having an upwardly extending rim the edge of which is turned inwardly to engage said interlocking formation on the shell to thereby permanently fix the gasket to the shell in centralized position with respect to the longitudinal axis of the plug.

ADOLPH F. KLINGNER.